US008713811B2

(12) United States Patent
Carrell

(10) Patent No.: US 8,713,811 B2
(45) Date of Patent: May 6, 2014

(54) PLUMBING PATH GUIDE APPARATUS

(76) Inventor: Daniel K. Carrell, Van Vleck, TX (US)

( * ) Notice: Subject to any disclaimer, the term of this patent is extended or adjusted under 35 U.S.C. 154(b) by 183 days.

(21) Appl. No.: 13/449,659

(22) Filed: Apr. 18, 2012

(65) Prior Publication Data

US 2013/0276316 A1 Oct. 24, 2013

(51) Int. Cl.
*G01B 5/25* (2006.01)

(52) U.S. Cl.
USPC ............................................... 33/529; 33/613

(58) Field of Classification Search
USPC .................................... 33/529, 613, 645, 412
See application file for complete search history.

(56) References Cited

U.S. PATENT DOCUMENTS

| | | | | |
|---|---|---|---|---|
| 5,461,793 | A | 10/1995 | Melville | |
| 6,052,911 | A | 4/2000 | Davis | |
| 6,834,435 | B2 | 12/2004 | Turner | |
| 7,467,474 | B1 | 12/2008 | Statham | |
| 2002/0133960 | A1 * | 9/2002 | Cross | 33/412 |
| 2013/0239423 | A1 * | 9/2013 | Knudsen | 33/645 |

* cited by examiner

*Primary Examiner* — G. Bradley Bennett
(74) *Attorney, Agent, or Firm* — Crossley Patent Law; Micah C. Gunn

(57) ABSTRACT

A plumbing path guide apparatus comprising a plurality of interconnectable elements, said elements interconnectable by means of female and male connectors configured to slidingly mate with each other, wherein a perceived plumbing path is erectable between at least two extant points whereby measurements of extant pipe required to plumb said plumbing path are ascertained as the apparatus is erected.

19 Claims, 14 Drawing Sheets

PLUMBING PATH GUIDE APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of measuring apparatuses are known in the prior art. However, what is needed is a plumbing path guide apparatus that includes a plurality of interconnectable elements, said elements interconnectable by means of female and male connectors configured to slidingly mate with each other, wherein a perceived plumbing path is erectable between at least two extant points whereby measurements of extant pipe required to plumb said plumbing path are ascertained as the apparatus is erected.

FIELD OF THE INVENTION

The present invention relates to a plumbing path guide apparatus, and more particularly, to a plumbing path guide apparatus that includes a plurality of interconnectable elements, said elements interconnectable by means of female and male connectors configured to slidingly mate with each other, wherein a perceived plumbing path is erectable between at least two extant points whereby measurements of extant pipe required to plumb said plumbing path are ascertained as the apparatus is erected.

SUMMARY OF THE INVENTION

The general purpose of the plumbing path guide apparatus, described subsequently in greater detail, is to provide a plumbing path guide apparatus which has many novel features that result in a plumbing path guide apparatus which is not anticipated, rendered obvious, suggested, or even implied by prior art, either alone or in combination thereof.

The present plumbing path guide apparatus has been devised to enable measurement of sections of extant pipe to be fitted within a desired plumbing path. The present plumbing path guide comprises a plurality of interconnectable elements erectable along a desired plumbing path whereby a plumber is enabled to read specific measurements thereby before fitting sections of extant pipe within said plumbing path. For the purposes of this specification, the term "plumbing path" is taken to mean any path desired for piping between at least two points. The present device has been devised to obviate the need for often complex calculations, to lessen errors in plumbing a desired plumbing path, save money by decreasing unnecessary expenditures therefrom, and provide a useful tool to plumbers for ascertaining exact measurements when plumbing a desired plumbing path.

The present plumbing path guide apparatus comprises a plurality of elements, each interconnectable and thereby erectable along a desired plumbing path. The act of erecting the instant plumbing path guide apparatus along said plumbing path provides the necessary measurements for determining sizes of sections of extant pipe, situation and orientation of said sections of pipe, such that once erected the dimensions of each relevant section of pipe are ascertained and the extent of the plumbing path is perceived. Thusly, relevant sections of extant pipe may then be cut or prepared for fitting within the plumbing path without errors being made and replacement necessitated.

The plurality of elements are interconnectable by means of female connectors and male connectors disposed to mate with each other between certain of said elements. A female connector releasably receives a male connector and is provided with securing means to releasably secure the male connector in place. In the preferred embodiment herein disclosed, said securing means includes a screw pin and alternately a connection hook in operational communication with a release button. Thusly, a variety of interconnection possibilities exist between said plurality of elements, with different of said elements interconnectable whereby any plumbing path is measurable at discrete and known increments.

The present plumbing path guide apparatus includes at least one measuring rod, a rectangular right prismatic elongation having indicia demarked thereupon for accurately determining extension and length. Said measuring rod is provided with a male connector disposed on either end, alternately a male connector disposed on one end and a female connector disposed on the other end, and alternately a female connector disposed on either end. Thusly, one of said measuring rod may be interconnected with another of said measuring rod, as desired, for demarking a particular section of said plumbing path.

To fit said measuring rod to an extant section of pipe from which said plumbing path is originated, or continued, at least one x-connector is provided. Said x-connector includes a central member and a plurality of connection members disposed radiating from said central member. Each of the plurality of connection members is a generally parallelepiped extension having a plurality of holes disposed thereupon, each of said plurality of holes disposed in a regular sequence along the length of said connection member. Each of the plurality of connection members is releasably attachable to a flange of an extant pipe by means of a plurality of fasteners. Thusly attached, the central member is disposed centrally within the opening of the extant pipe. A female connector is perpendicularly disposed upon the central member, and the at least one measuring rod is interconnectable thereto to extend within a congruent plane of said extant pipe to which the x-connector is releasably attached.

To provide further connectivity of the present plumbing path guide apparatus to an extant pipe, but on the exterior of said extant pipe, at least one saddle connector is included. The at least one saddle connector includes a base member having a first end and a second end. The base member is a generally parallelepiped, flexible body adapted to conform to the curvature of the exterior of an extant pipe. A first strap is disposed at the first end, said first strap depending therefrom disposed to girdle said pipe and releasably fasten around said pipe by means of a hook and loop fastener in operational communication with a buckle. A pair of second straps are disposed depending from the base member proximal to the second end, and each of the pair of second straps is releasably attachable around said pipe to releasably secure the base member to the exterior surface of said pipe.

A first adjustment screw is disposed perpendicularly upon the base member, the first adjustment screw rotatably disposed thereat and extensible through the base member to releasably engage with the exterior of said extant pipe. The first adjustment screw releasably secures the base member to the exterior of an extant pipe and further provides for fitting the saddle connector to a section of extant pipe wherein said section of extant pipe comprises pipe having different diameters. Thusly the base member may be positioned upon the exterior of an extant pipe and the first adjustment screw utilized to releasably engage with a section of pipe having a different diameter. Furthermore, as desired, the first adjustment screw is useable to increase a declination of the base member when releasably attached to the exterior of an extant pipe.

A second adjustment screw is disposed on one of the pair of second straps, said second adjustment screw rotatably extensible therethrough to likewise releasably engage with the exterior of said extant pipe. The second adjustment screw releasably secures the saddle connector to the exterior of an extant pipe, and is useable also to releasably engage with the exterior of a section of pipe having a different radius relative the section of pipe upon which the base member is attached.

Furthermore, a plurality of spacers are included, each of the plurality of spaces including a hemi-cylindrical body configured to conform to the curvature of an extant pipe of known diameter. For pipes having diameters too small to securely mount the saddle connector, at least one of the plurality of spacers is useable to fit the saddle connector thereupon, the at least one of the plurality of spacers positioned upon the exterior of said pipe. In the preferred embodiment herein disclosed, a 1 inch pipe spacer, a 2 inch pipe spacer, and a 3 inch pipe spacer are included. Additional spacers for use with other sized pipes, however, are considered as part of the instant plumbing path guide apparatus.

The saddle connector may be releasably attachable to each of the plurality of spacers by means of a plurality of fasteners releasably insertable through the base member into a corresponding plurality of holes disposed upon each of the plurality of spacers, as desired.

A female connector is disposed atop the base member of the saddle connector, the female connector disposed perpendicularly thereupon. A leveling member is disposed on the base member proximal the female connector, wherein a spirit level displays the orientation of the saddle connector, said orientation readable by means of a dial disposed proximal the spirit level. Thusly the inclination of the saddle connector is determinable, and the base member is positionable at a desired inclination or declination, as desired.

At least one sliding T connector is included. The at least one sliding T connector is a multi-functional element enabling a variety of interconnections between measuring rods and other elements. The sliding T connector includes a first cross piece disposed right angularly with respect to a second cross piece. The second cross piece includes a first arm and a second arm disposed opposite each other on either side of the first cross piece. Thusly, the first cross piece and the second cross piece form an equilateral cross.

The first cross piece is hollow, and is configured to slidingly engage with a measuring rod inserted therethrough. The first and second arms of the second cross piece comprise female connectors disposed on either side of the first cross piece wherein a male connector is insertable into the first arm and a male connector is insertable into the second arm. The sliding T connector is thusly slidable along the length of a measuring rod when said measuring rod is inserted through the first cross piece. The first cross piece is also useable as a pair of female connectors, as desired, and has relevant securing means (screw pins) disposed thereupon to releasably secure a male connector in place.

A vertical piece is centrally disposed on the sliding T connector, projecting downward relative the first cross piece and the second cross piece. A female connector is disposed on the vertical piece whereby the sliding T connector is attachable to a male connector oriented vertically with respect to the sliding T connector. A pair of male connectors are disposed atop the first cross piece, each of said pair of male connectors releasably attachable to an arch member connectable to the sliding T connector. The arch member includes a female connector disposed atop a vertex of the arch member.

A plate member is centrally disposed atop the first cross piece and the second cross piece. A measuring field is centrally disposed within the plate member with discrete indicia demarked for ascertaining situational relationships with respect to the sliding T connector. A pair of spirit levels are disposed in the plate member, each of the pair of spirit levels disposed perpendicularly relative each other, whereby the inclination and declination of the sliding T connector are discernible.

A pair of slide runners is disposed atop the sliding T connector, each of the pair of slide runners disposed atop each of the first arm and the second arm respectively. The slide runners include indicia demarking discrete intervals along the length of the first arm and second arm and a plurality of ridges is disposed in each of the pair of slide runners, each of said plurality of ridges disposed at a known interval along each of said slide runners. The plurality of ridges enable extant string line to be strung therefrom to demark a boundary in space at a known distance from the center of the sliding T connector. Each of a pair of measuring tapes is slidably extensible endwise from each of the pair of slide runners.

For sighting an endpoint of a desired plumbing path, or section thereof, a laser member is included. The laser member includes a housing having a female connector and a male connector disposed on either end. A laser is disposed within the housing, said laser configured to shine therefrom along a straight line of sight congruent with the plane of the housing. A sighting member is slidingly attachable to the housing, said sighting member including an aperture through which the laser is configured to shine. A release button is disposed on the housing to disconnect the female connector disposed on the laser member housing from an interconnected male connector and an on/off button is included to alternately activate and deactivate the laser as desired.

The laser member is therefore connectable to a male connector, for example disposed at the end of a measuring rod, and operable to demark an endpoint at the end of a desired line of sight.

A guide member is included. The guide member is adapted to be used to support at least one measuring rod erected along a desired plumbing path, and also to target the laser member to a specific point in a grid disposed upon a grid plate releasably attachable to the guide member. The guide member includes a female connector configured to slidingly receive a measuring rod therethrough, such that the guide member is slidably positional along the length of a measuring rod, a support member disposed upon the female connector, and a horizontal bar disposed upon the support member. A pair of vertical bars are disposed endwise on either end of the horizontal bar. A guide member is disposed upon the horizontal bar, the guide member configured to releasably receive and support a measuring rod therethrough. The guide piece is oriented perpendicularly with respect to the female connector disposed on the guide member support member, and thus enables right-angular coupling of measuring rods. A releasably fastenable latch is disposed upon the guide piece, said latch included to secure a measuring rod within the guide piece when the guide member is disposed in a situation wherein the guide piece is oriented upside down or otherwise off of a horizontal plane.

The aforementioned gird plate, useable for demarking a line of sight and ascertaining a particular spatial orientation of the guide member with respect to the laser member, is releasably attachable to the horizontal bar and each of the pair of vertical bars. The grid disposed on the grid plate demarks specific intervals across the area of said grid plate, and the laser member may be positioned relative the guide member to correspond to a particular line of sight as discerned by the grid. A door is centrally disposed within the grid plate, said door openable to garner a reading upon a measuring rod, or another grid plate as desired, used in conjunction with said guide member when the laser is shone through said door.

For interconnecting measuring rods and other elements at 45 degrees relative each other, a 45 degree connector piece is included with the instant plumbing path guide apparatus. The 45 degree connector piece comprises two female connectors disposed at an angle of 45 degrees relative each other.

For ascertaining angles other than 45 degrees and 90 degrees, a rotating offset connector is included. The rotating offset connector comprises a first female connector rotatably disposed in a plane congruent with a second female connector. A first plate is disposed between the first female connector and the second female connector, said first plate disposed endwise upon the first female connector. A second plate is disposed adjacent the first plate between the first female connector and the second female connector, the second plate disposed endwise upon the second female connector. When rotated, the second plate rotates with respect to the first plate, and an angular reading is discernable from indicia disposed on the second plate relative the first plate. A ratchet mechanism is included wherein the rotation of the second female connector relative the first female connector is effectuated in discrete increments corresponding to degrees of arc. Thusly, an element connected to the second female connector is rotatable to a desired angle relative an element connected to the first female connector.

A support base is included with the instant plumbing path guide apparatus. The support base enables support and secured mounting of elements either off the ground or another surface, as desired, when erecting the instant plumbing path guide apparatus along a desired plumbing path. The support base includes a rubberlike foot member and a base plate disposed atop the rubberlike foot member. Three female connectors are centrally disposed atop the base plate, each of said three female connectors disposed perpendicular to each other whereby extension of another element in each of three directions is effectuated. At least one stand measuring rod is interconnectable with each of the three female connectors disposed upon the base plate. The stand measuring rod is identical with respect to the aforementioned measuring rod except that the stand measuring rod is considered to be shorter than the at least one measuring rod. It should be readily apparent, therefore, that the support base is interconnectable with the at least one measuring rod, where desired, and that the stand measuring rod is useable with all other elements with which the measuring rod is also interconnectable.

To secure the support base to surfaces disposed off the horizontal a clamp member is included. The clamp member is rotationally secureable through the base by means of a fastener, and the support base is thereby releasably secureable to inclined surfaces by means of the clamp member. When the clamp member is not in use, said clamp member is storable within the rubberlike foot member.

Thusly, the instant plumbing path guide apparatus is erectable to demark a desired plumbing path between at least two points. Each of the elements comprising the instant plumbing path guide apparatus is interconnectable whereby any desired plumbing path is erectable. The instant plumbing path guide apparatus is considered to include pluralities of said elements whereby numerous combinations of said elements are possible to erect a desired plumbing path. To better understand the interconnectivity of the instant plumbing path guide apparatus, the following example is provided. However, it should be clear that the following example demonstrates just one possible arrangement of the elements of the instant plumbing path apparatus, and said plumbing path apparatus should not be considered limited to said arrangement.

An x-connector is connected to the opening of an extent pipe wherefrom a desired plumbing path is required for piping to a known endpoint. A measuring rod is releasably connected to the female connector disposed on the central member of the x-connector, and the measuring rod now extends along a line congruent with the plane in which the extant pipe is oriented. A sliding T connector is fitted to the measuring rod, and moved along the measuring rod to a desired distance from the extant pipe. The sliding T connector is releasably secured thereat by means of the screw pins disposed on the female connectors of the first cross piece through which the measuring rod is inserted. A second measuring rod is fitted to the vertical piece of the sliding T connector, and a second sliding T connector is slidingly attached to the second measuring rod at a known position along said measuring rod's length. An arch member is fitted to the second sliding T connector, and a laser member attached to the female connector disposed in the vertex of the arch member. The laser is activated and shines onto a grid plate attached to a guide member disposed on a support base mounted proximal the end point. The second sliding T connector is adjusted until the laser targets a desired point on the grid plate. The laser member is then removed, and a third measuring rod is then connected to the vertex of the arch member.

The above example demonstrates how several of the elements of the instant plumbing path guide apparatus are interconnectable and useable to delimit a desired plumbing path. Desired measurements are ascertainable by taking readings directly of the measuring rods. It should be noted that additional special situations along a desired plumbing path are possible when the 45 degree connector is used, or when the rotating offset connector is used to position one measuring rod with respect to another.

Thus has been broadly outlined the more important features of the present plumbing path guide apparatus so that the detailed description thereof that follows may be better understood and in order that the present contribution to the art may be better appreciated.

Objects of the present plumbing path guide apparatus, along with various novel features that characterize the invention are particularly pointed out in the claims forming a part of this disclosure. For better understanding of the plumbing path guide apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
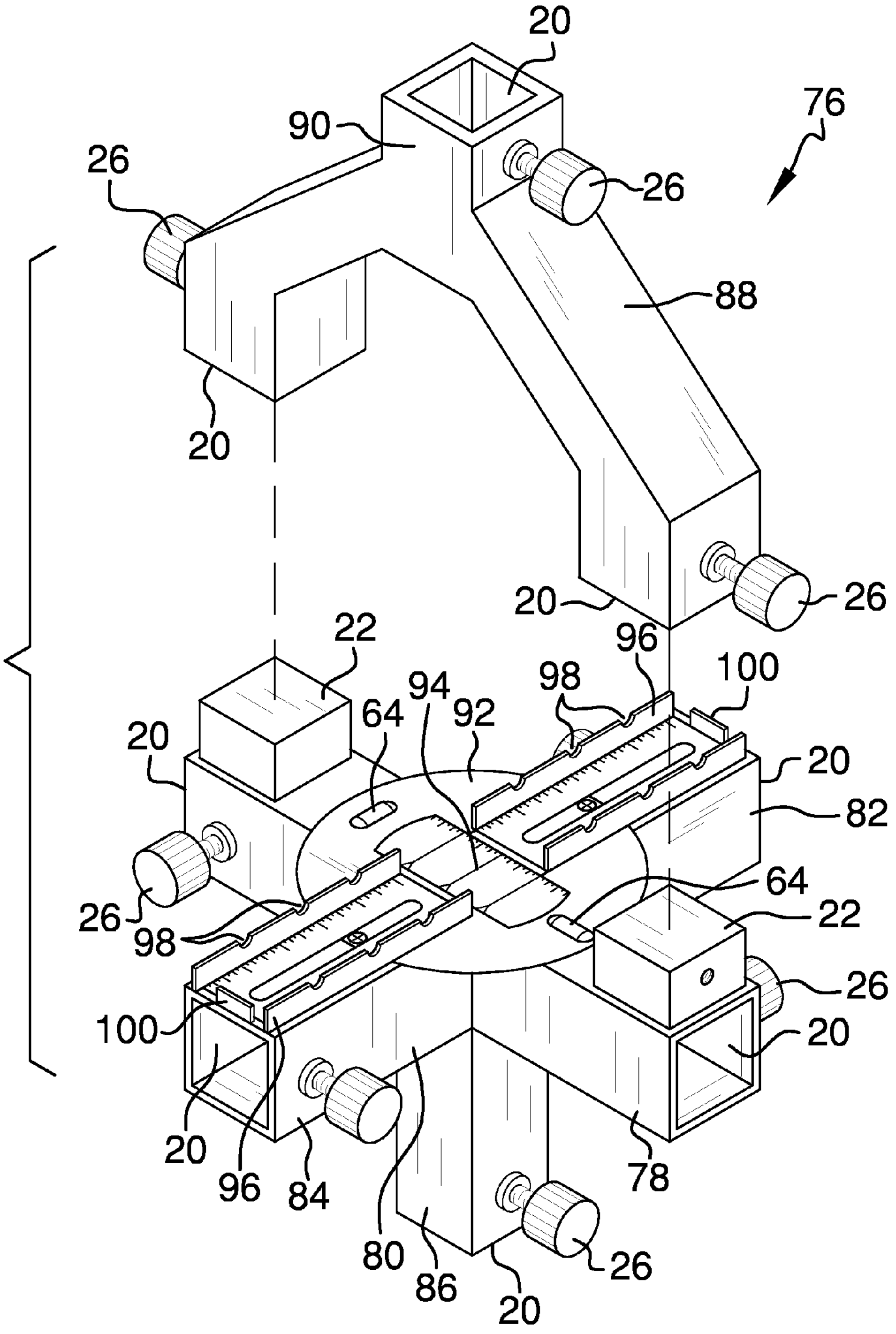
FIG. 1 is a isometric view of a sliding T connector.
Figure 2:
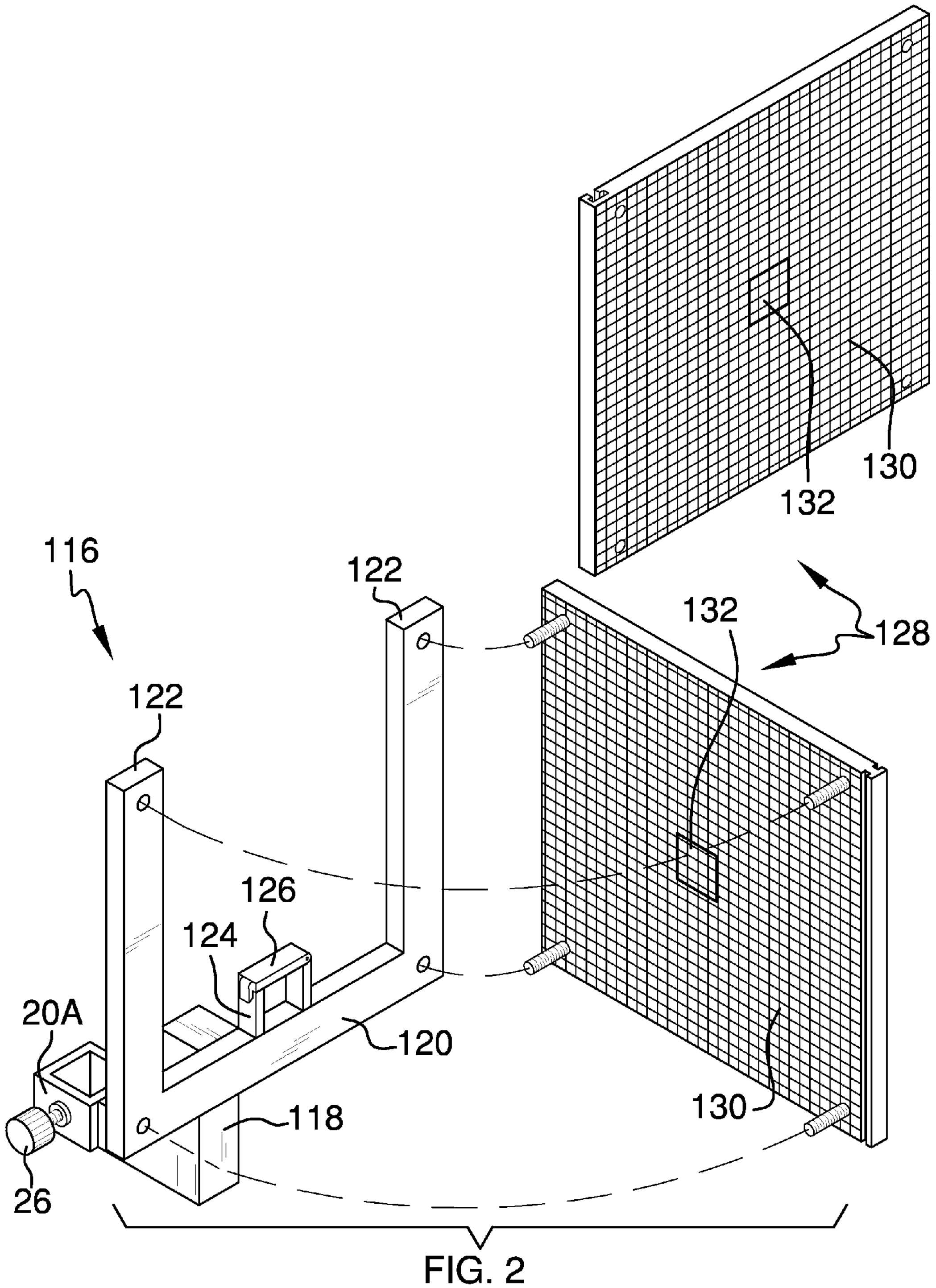
FIG. 2 is a isometric view of a guide member.
Figure 3:
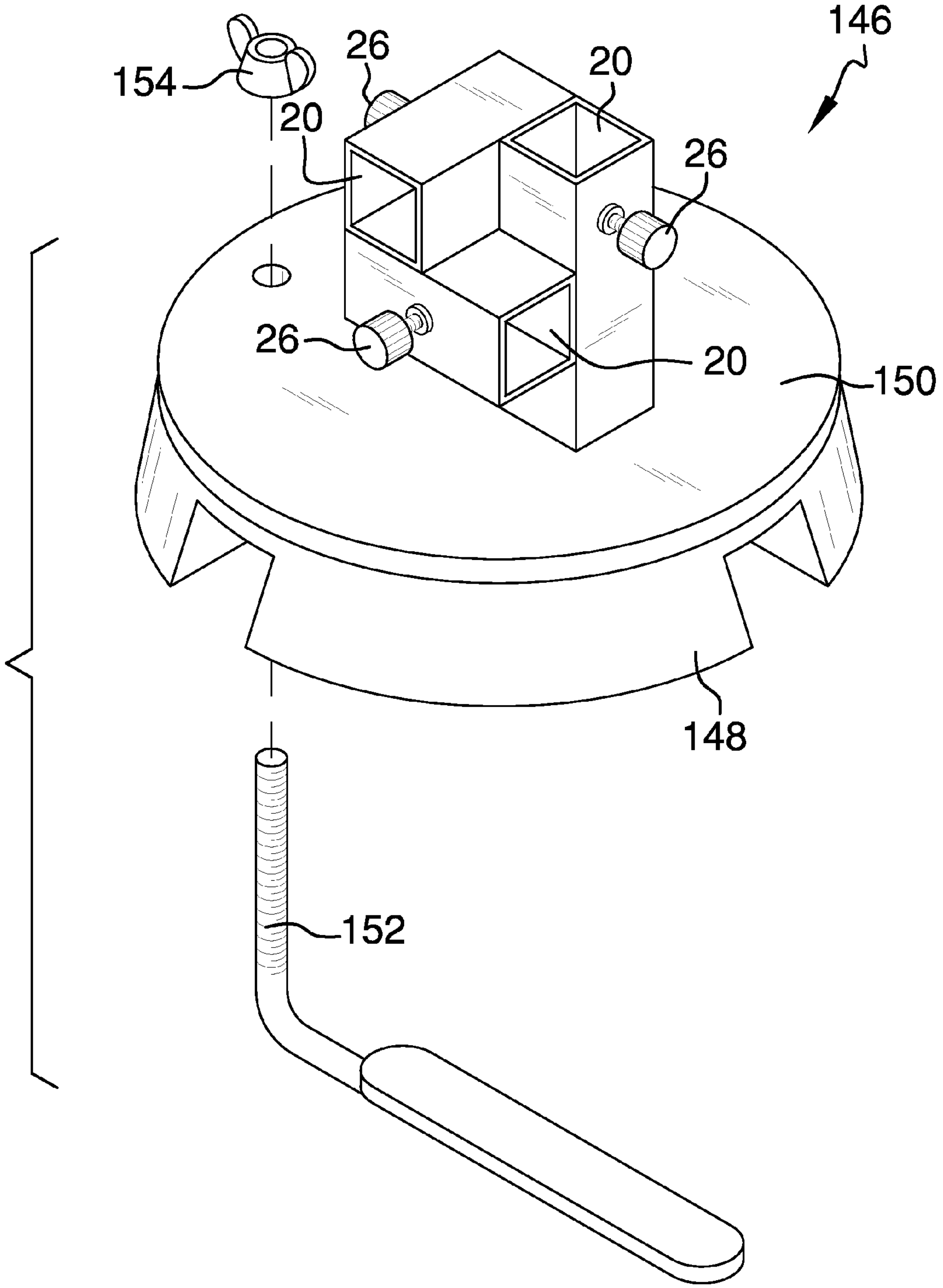
FIG. 3 is a isometric view of a support base.

With reference now to the drawings, and in particular FIGS. 1 through 14 thereof, example of the instant plumbing path guide apparatus employing the principles and concepts of the present plumbing path guide apparatus and generally designated by the reference number 10 will be described.

Referring to FIGS. 1 through 14 a preferred embodiment of the present plumbing path guide apparatus 10 is illustrated.

The plumbing path guide apparatus 10 consists of a plurality of interconnectable elements erectable along a desired plumbing path for measuring sections of extant pipe to be plumbed along said plumbing path. Use of the instant plumbing path guide 10 enables a plumber to read off measurements at desired places and obviates the need for calculations otherwise necessary for fitting said pipe along said plumbing path. Thusly, a plumber may use the instant device 10 to measure out precise sections of extant pipe fittable to the desired plumbing path by simply erecting the device 10 between at least two given points.

Figure 14:
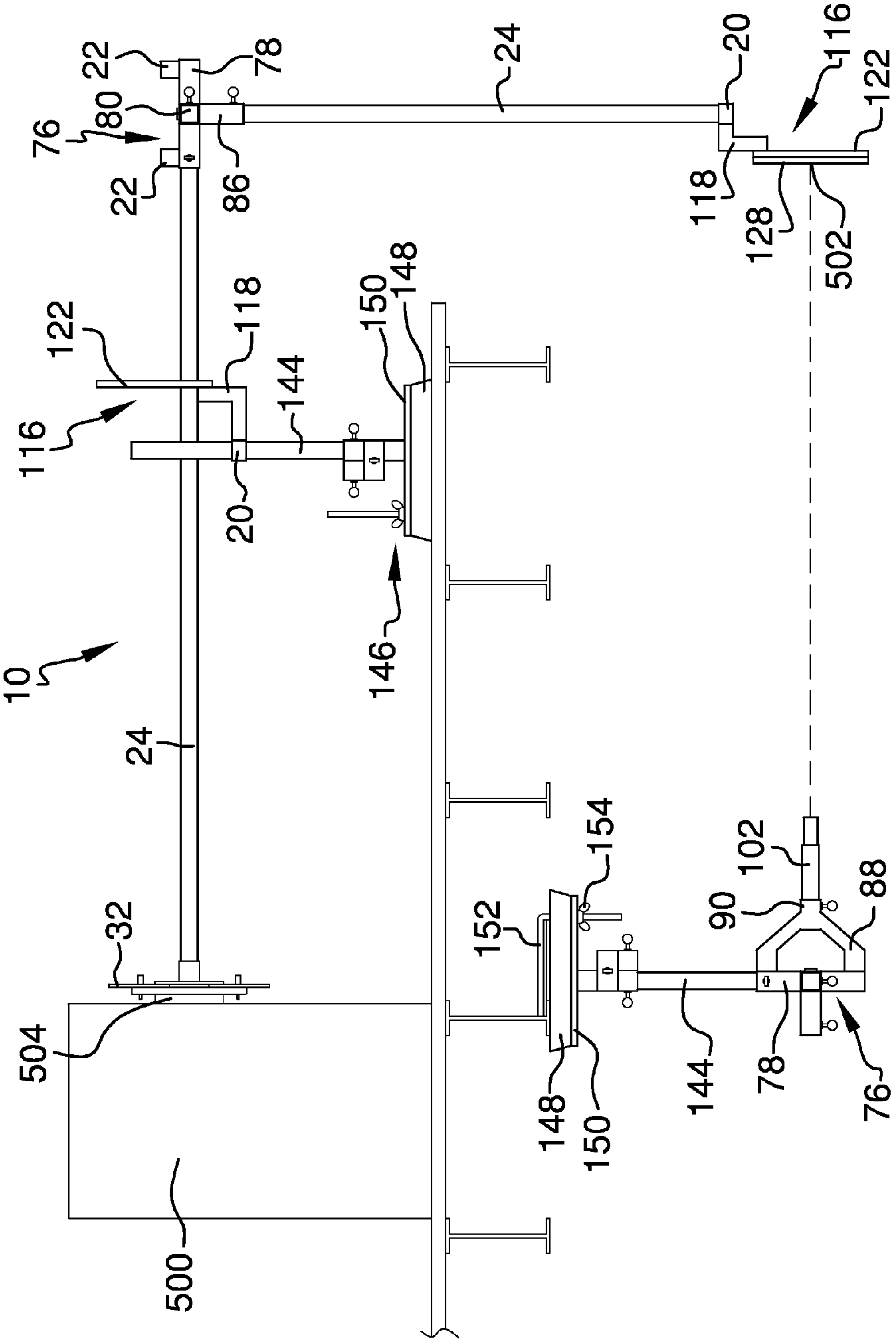
FIG. 14 is a side view of an assemblage of at least one of the elements comprising the plumbing path guide apparatus erected along a desired plumbing path.

Each of the plurality of elements, to be described in further detail subsequently, is interconnectable by means of female connectors 20 and male connectors 22 which releasably mate together to secure said elements along a desired plumbing path. FIG. 14 shows an example of a desired plumbing path, from a water tank 500 to an endpoint 502. FIG. 14 provides a stylized view of the apparatus 10 with at least one of the plurality of elements used. The Figure is not intended to limit the apparatus 10 to any particular configuration; the apparatus 10 is useable to erect any plumbing path desired wherein relevant sections of extant pipe will be fitted.

The device 10 includes at least one measuring rod 24, a rectangular right prismatic member having indicia disposed thereupon for measuring distance along the desired plumbing path. Said measuring rod 24 may have a male connector 22 disposed at each end, said male connector 22 connectable to any female connector 20 disposed on another element of the instant plumbing path guide apparatus 10. Said measuring rod 24 may also be provided with a female connector 20 at one end and a male connector 22 disposed at the other end. Further, said measuring rod may be provided with a female connector 20 disposed at each end. Each female connector 20 has a securing means disposed thereon, whereby a male connector 22 is releasably secured within the female connector 24. In the preferred embodiment herein disclosed, said securing means is considered as a screw pin 26 and alternately a connection hook 28 and release button 30 (as shown, for example, in FIG. 5).

Figure 4:
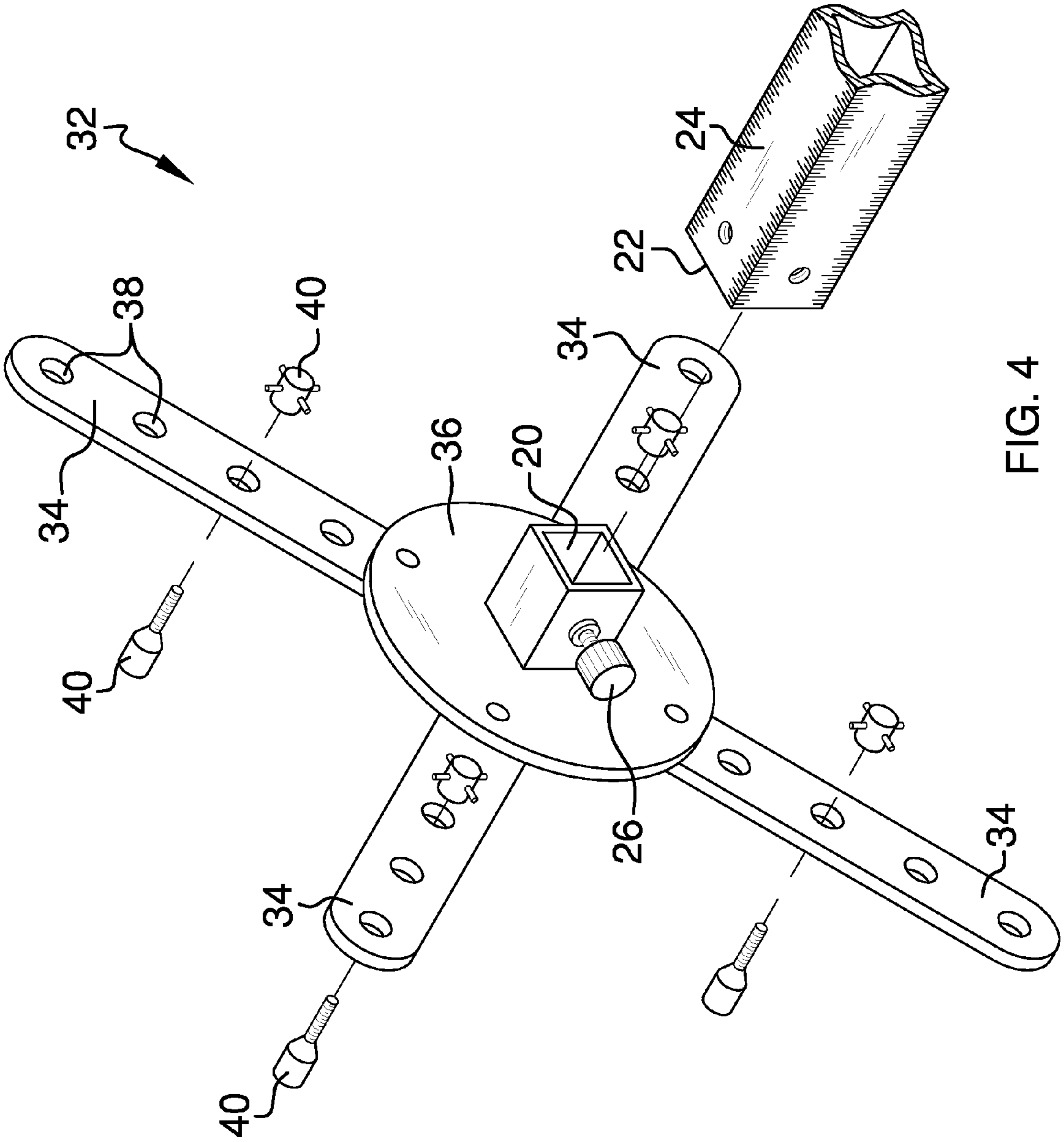
FIG. 4 is a isometric view of an x-connector.

As detailed in FIG. 4, an x-connector 32 is included. The x-connector 32 is releasably attachable to an extent pipe 504 (see FIG. 14) by means of a plurality of attachment members 34 disposed extending radially from a central member 36. Each of the plurality of attachment members 34 has a plurality of holes 38 disposed thereon. Each of the plurality of holes 38 is configured to releasably receive each of a plurality of fasteners 40 therethrough. The x-connector 32 is thereby releasably securable to a flange of an extant pipe 504. A female connector 20 is disposed perpendicularly upon the central member 36. Said female connector 20 is connectable with a male connector 22 disposed on another element of the instant plumbing path guide apparatus 10. Thereby, a measuring rod 24, for example, is releasably connectable to the x-connector 32 and, when the x-connector 32 is releasably attached to an extant pipe 504 in the manner aforementioned, the measuring rod 24 is extendible therefrom in a plane congruent with the extant pipe 504.

Figure 7:
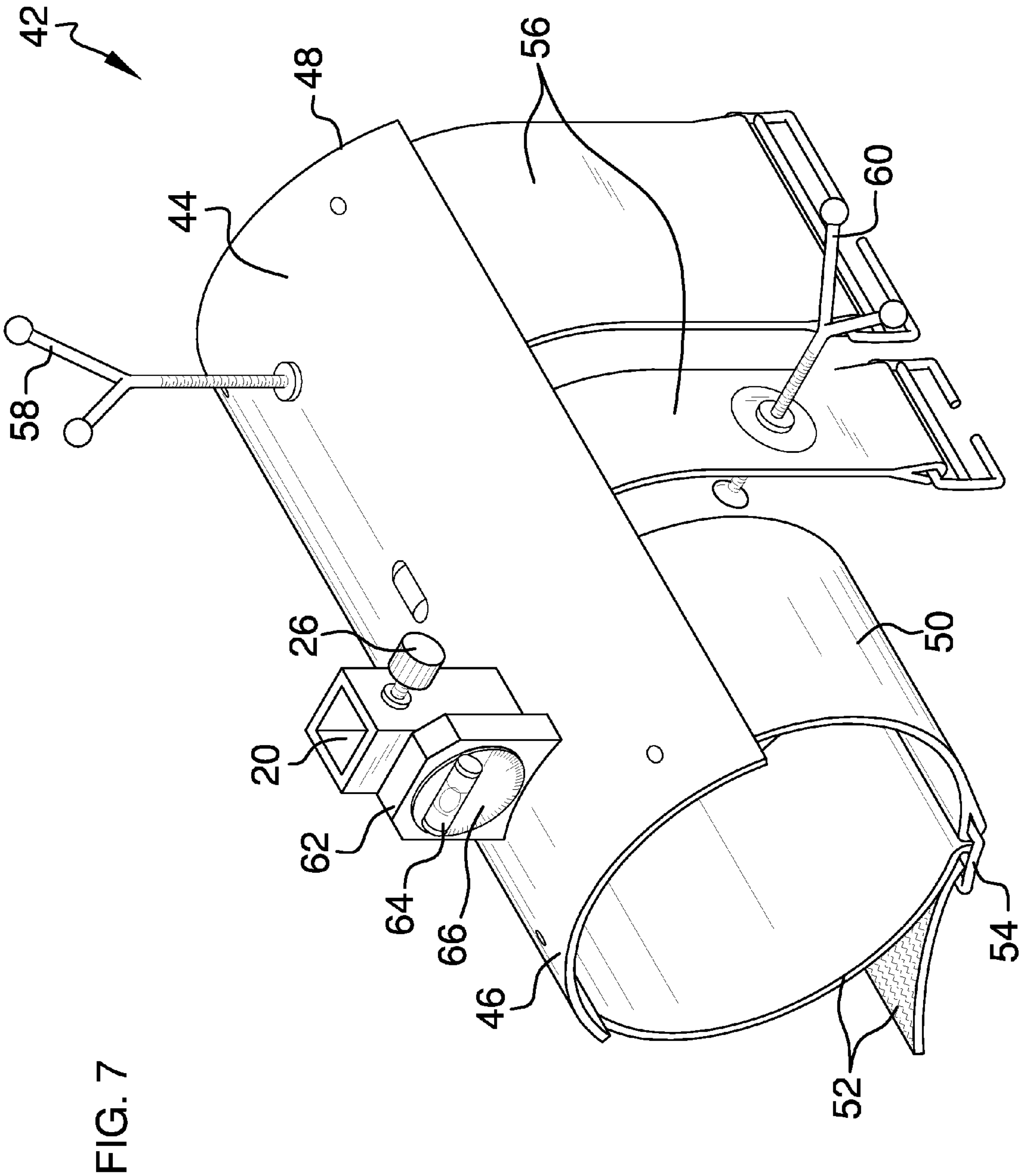
FIG. 7 is an isometric view of a saddle connector.
Figure 8:
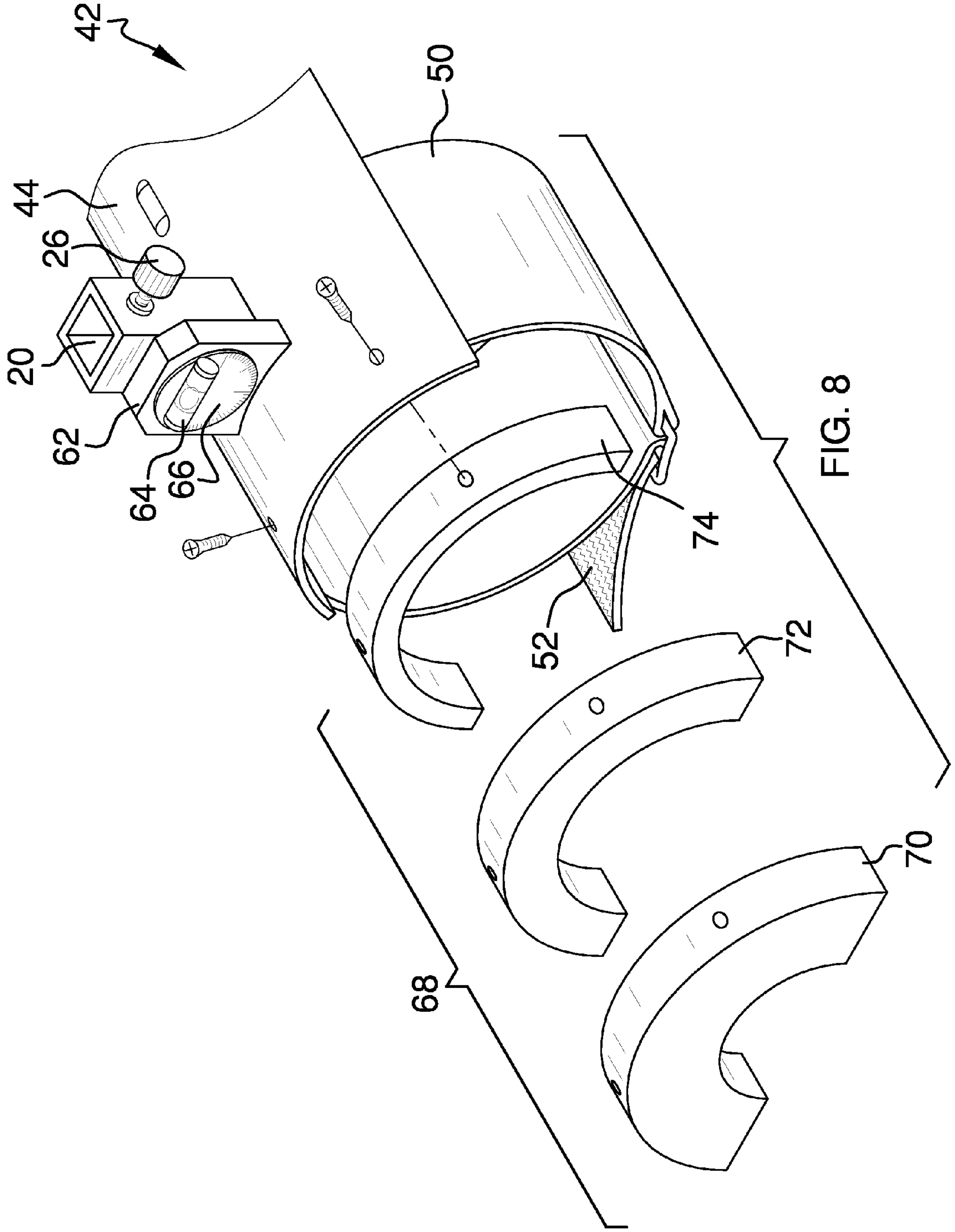
FIG. 8 is an isometric view of a portion of the saddle connector and a plurality of spacers.
Figure 9:
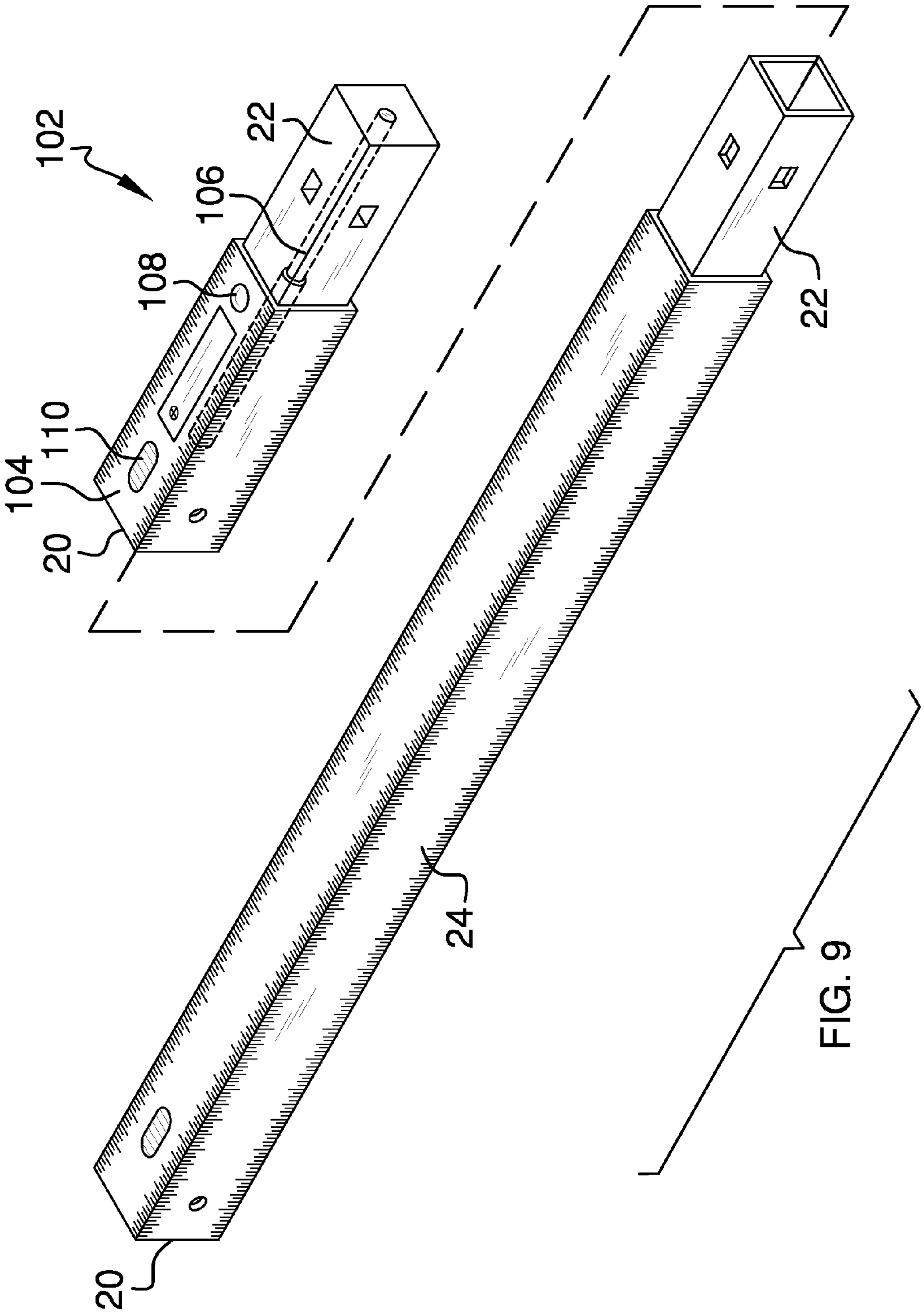
FIG. 9 is an isometric view of a laser member and a measuring rod.

At least one saddle connector 42 is also included, the saddle connector 42 configured to girdle an extant pipe (see FIGS. 7 and 8). The saddle connector 42 includes a base member 44 configured to overlie an extant section of pipe, the base member 44 having a first end 46 and a second end 48. A first strap 50 is disposed on the base member 44 first end 46, the first strap 50 depending therefrom. The first strap 50 is configured to be releasably attachable around said extant section of pipe and, as illustrated in the preferred embodiment disclosed herein, is fastenable by a hook and loop fastener 52 threaded through a buckle 54.

A pair of second straps 56 is disposed on the base member 44, one of said pair of second straps 56 proximal to the center and the other of said pair of second straps 54 proximal to the second end 48, each of said pair of second straps 56 configured to be releasably attachable around said extant section of pipe. A female connector 20 is disposed perpendicularly atop the base member 44. Thusly, the saddle connector 42 is attachable around an extant pipe and a measuring rod 24, or other element of the instant plumbing path guide apparatus 10, is extendible therefrom, as desired.

A first adjustment screw 58 is disposed upon the base member 44, said first adjustment screw 58 rotatably disposed thereat. The first adjustment screw 58 is rotatable and extensible through the base member 44 whereby the base member 44 is situational atop an extant pipe section. A second adjustment screw 60 is disposed in one of the pair of second straps 56. The second adjustment screw 60 is rotatably disposed thereat, and the second adjustment screw 60 is likewise rotatable whereby the saddle connector 42 is situationally secureable with respect to the section of extant pipe. The saddle connector 42 is thereby attachable to a section of extant pipe having pipe sections of varying diameter, for example, or positionable at a desired inclination thereupon. The first adjustment screw 58 and the second adjustment screw 60 releasably secure the base member 44 to the pipe and a leveling member 62, disposed proximal to the female connector 20, enables the saddle connector 42 to be situated at a desired angle by means of a spirit level 64 and a dial 66 disposed thereupon.

A plurality of spacers 68 is included for use with the saddle connector 42 (see FIG. 8). Each of the plurality of spacers 68 is a curved member configured to girdle a section of extant pipe whereby the saddle connector 42 is situational atop pipe sections of varying diameter. The base member 44 of the saddle connector 42 is supportable atop each of the plurality of spacers 68 when the saddle connector 42 is used in conjunction with a section of extant pipe comprising varying diameters, or with pipes that have a diameter small enough to warrant use of a particular one of the plurality of spacers 68. In the preferred embodiment depicted in FIG. 8, the plurality of spacers 68 includes a 1 inch pipe spacer 70, a 2 inch pipe spacer 72, and a 3 inch pipe spacer 74.

At least one sliding T connector 76 is included (see FIG. 1). The sliding T connector 76 is slidably positional upon the at least one measuring rod 24. The sliding T connector 76 is also interconnectable with the at least one measuring rod 24. The sliding T connector 76 includes a first cross piece 78 configured to slidingly engage with the at least one measuring rod 24, said measuring rod 24 insertable through the first cross piece 78.

A second cross piece 80 is disposed perpendicularly with respect to the first cross piece 78. The second cross piece 80 includes a first arm 82 and a second arm 84, each of the first arm 82 and the second arm 84 disposed opposite each other on either side of the first cross piece 78. A female connector 20 is disposed upon each of the first arm 82 and the second arm 84.

A vertical piece 86 is centrally disposed upon the first cross piece 78, the vertical piece 86 oriented perpendicularly and downwardly from the first cross piece 78. The vertical piece 86 includes a female connector 20 disposed endwise thereupon. When the sliding T connector 76 is connected to another element of the plumbing guide apparatus 10 by means of the vertical piece 86, each of the first cross piece 78 and second cross piece 80 is disposed in a plane normal said vertical piece 86, each of the first cross piece 78 and second cross piece 80 oriented right angularly relative each other.

A pair of male connectors 22 is disposed atop the first cross piece 78 and an arch member 88 is connectable with the pair of male connectors 22. The arch member 88 has a female connector 20 disposed at a vertex 90 thereof. The arch member 88 enables coupling of additional elements in a plane congruent with the vertical piece 86, as is readily apparent in FIG. 1. A plate member 92 is centrally disposed upon the first cross piece 78 and the second cross piece 80, and a pair of spirit levels 64 is disposed in the plate member 92 whereby the orientation of the sliding T connector 76 is discernible. A measuring field 94 is centrally disposed within the plate member 92, the measuring field 94 including indicia thereupon for measuring situational aspects relative the sliding T connector 76 as desired when erecting a particular plumbing path.

A pair of slide runners 96 is disposed on the plate member 92 on either side of the measuring field 94, each of the pair of slide runners 96 disposed upon each of the first arm 82 and second arm 84 of the second cross piece 80. The pair of slide runners 96 is configured with indicia to measure spatial situations arising from position of the sliding T connector 76. A plurality of ridges 98 is disposed upon each of the pair of slide runners 96, the plurality of ridges 98 configured to align extant string line (not shown) strung therefrom. An extensible measuring tape 100 is slidably disposed endwise in each of the pair of slide runners 96. Extant string line (not shown) may therefore be strung between at least two sliding T connectors 76, as desired, to garner dimensions and breadth of extant pipe to be fitted within a desired plumbing path. Moreover, the measuring tape 100 may be extended from each of the pair of slide runners 96 and a desired distance ascertained therefrom.

As should be readily apparent from the Figures included with this specification, the at least one measuring rod 24 is slidably situational within the first cross piece 78 of the at least one sliding T connector 76 and secureable therein, and each female connector 20 on the sliding T connector 76 releasably secures a male connector 22 inserted thereinto. Thusly, at least one measuring rod 24 may be situated along a vertical plane relative the sliding T connector 76 (by interconnecting said measuring rod 24 with the arch member 88 and alternately with the vertical piece 86) or a horizontal plane relative the sliding T connector 76 (by interconnecting said measuring rod 24 with the first cross piece 78 and alternately the second cross piece 80), as desired.

Figure 10:
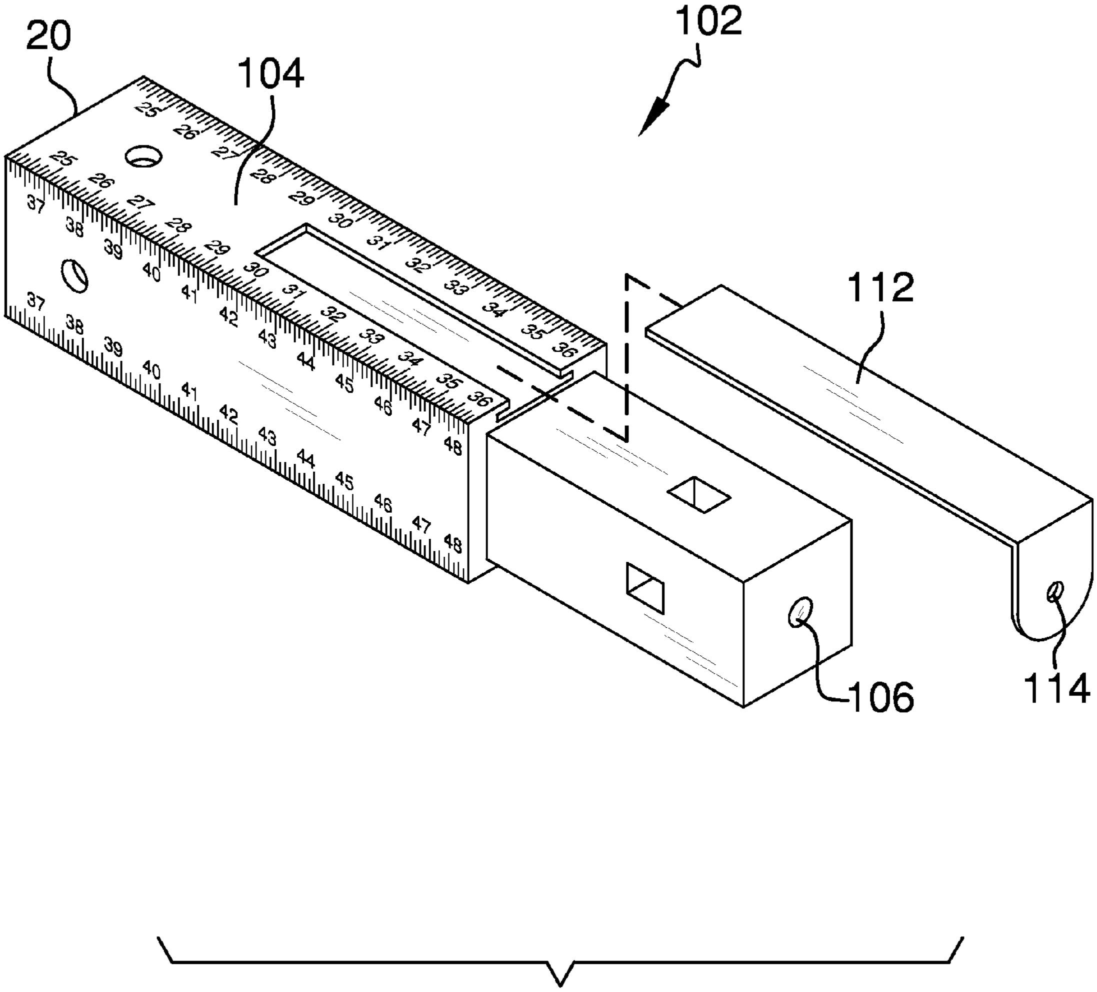
FIG. 10 is a detail view of the laser member.
Figure 11:
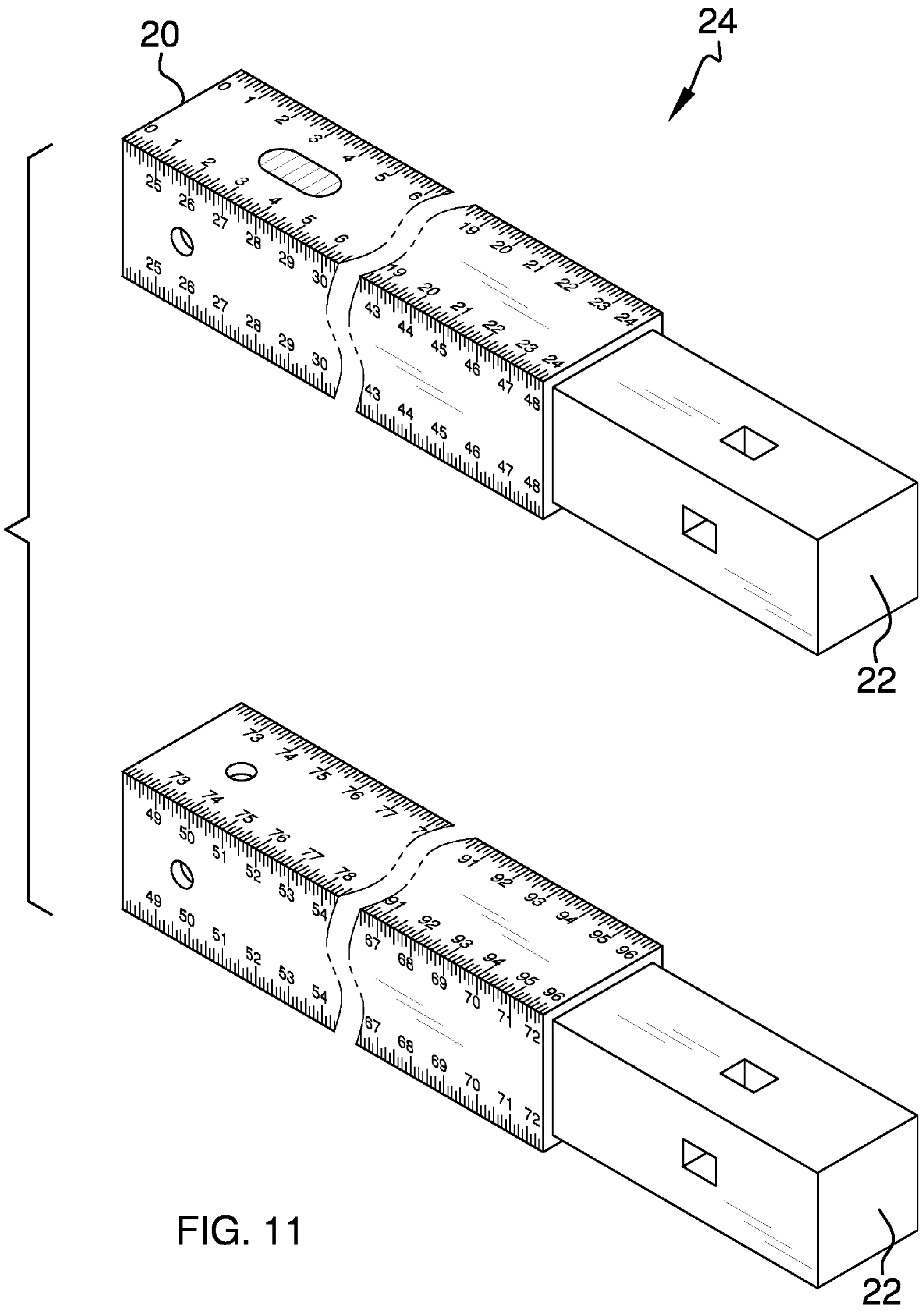
FIG. 11 is a detail view of a measuring rod.
Figure 12:
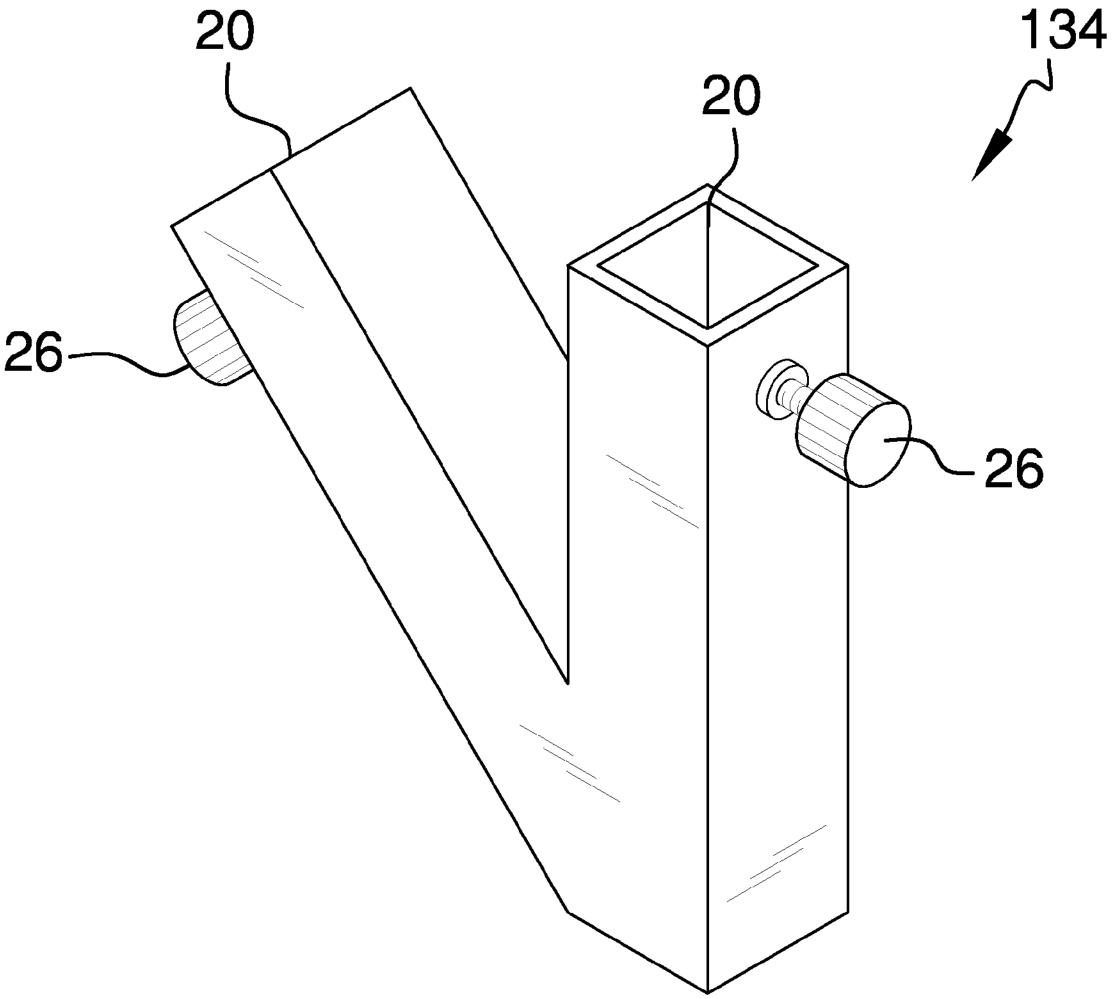
FIG. 12 is an isometric view of a 45 degree connector piece
Figure 13:
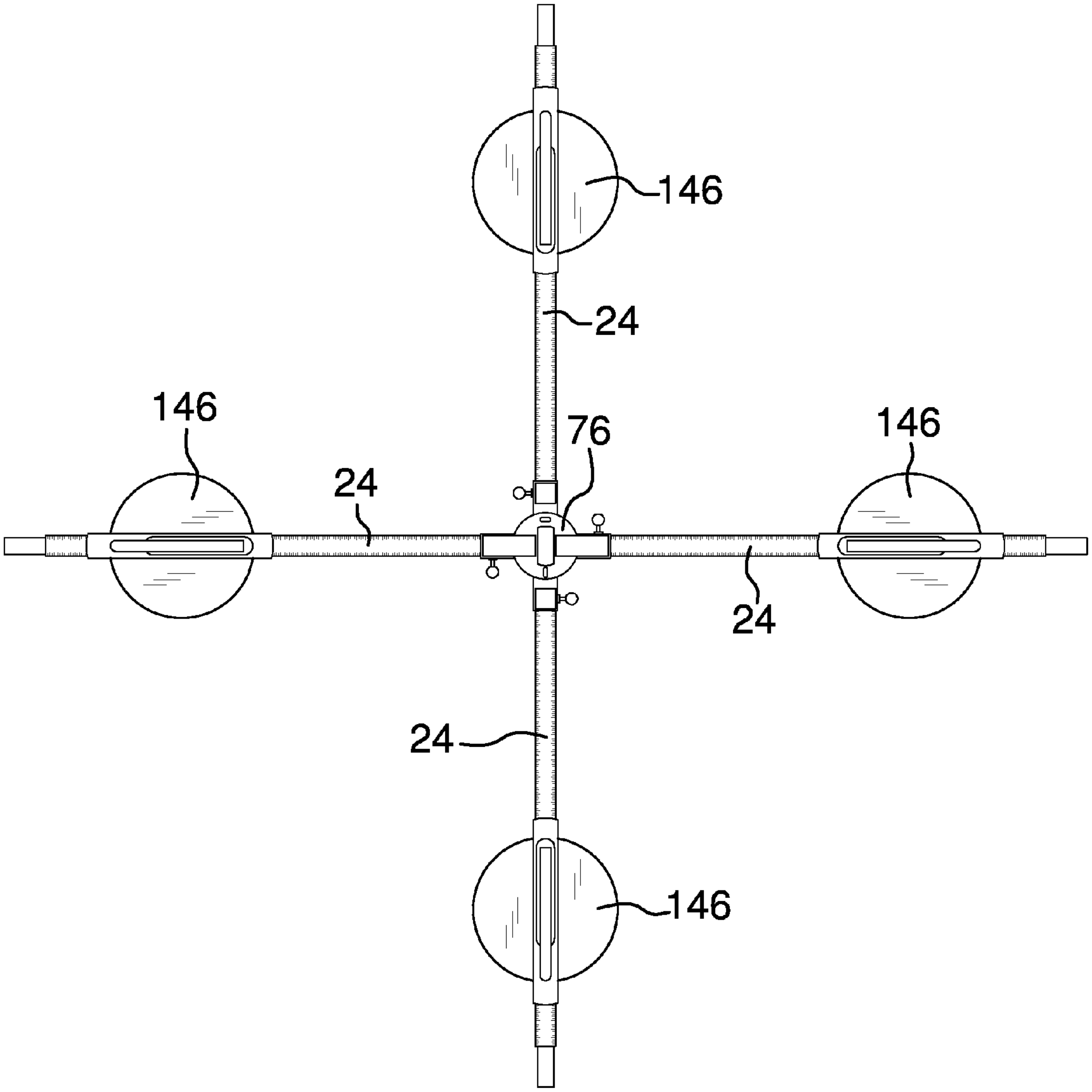
FIG. 13 is a top view of an assemblage of at least one of the elements comprising the plumbing path guide apparatus.

At least one laser member 102 (see FIG. 9) is included for use with the plumbing guide apparatus 10. The laser member 102 includes a housing 104 configured to resemble and interconnect with the at least one measuring rod 24, a laser 106 centrally disposed within the housing 104, a male connector 22 end, a female connector 20, an on-off button 108, and a release button 110 configured to disconnect the female connector 20 when depressed. The laser 106 shines a dot in a plane level with the housing 104 whereby the position of the laser 106 is sensible in space, and a desired positional relationship with respect to said laser 106 is discernible (see FIG. 14). As shown in FIG. 10, the preferred embodiment of the laser member 102 includes a sighting member 112 slidably connectable to the housing 104, said sighing member having an aperture 114 disposed therein wherein the laser 106 can be directed.

At least one guide member 116 is included, said guide member 116 including a female connector **20*a* configured to slidably receive a measuring rod 24 therein, the female connector 20*a* configured to be slidably positional along said measuring rod 24. A support member 118 is disposed upon the female connector 20*a*, said support member 118 connected to a horizontal bar 120. The horizontal bar 120 is disposed upon the support member 118 and a pair of vertical bars 122 is disposed on the horizontal bar 120, each of the pair of vertical bars 122 disposed on either end of the horizontal bar 120**.

A guide piece 124 is disposed upon the horizontal bar 120, said guide piece 124 configured to releasably receive a measuring rod 24 therethrough. A releasable latch 126 is disposed upon the guide piece 124, said latch 126 configured to releasably secure a measuring rod 24 to the guide piece 124 when the at least one guide member 116 is used upside down or in a non-horizontal plane.

At least one grid plate 128 is releasably attachable to the horizontal bar 120 and each of the pair of vertical bars 122, said at least one grid plate 128 having a grid 130 disposed thereupon, said grid 130 demarking regular and known intervals across the area of the grid plate 128. The grid plate 128 enables targeting of the laser 106 to sight a desired plumbing path. A door 132 is hingedly disposed centrally within the at least one grid plate 128, said door 132 openable whereby a laser reading is further enabled upon a measuring rod 24 slidably mounted to the guide piece 124, as desired. Thusly, the grid plate 128 demarks, and the guide member 116 enables, desired measurements when the laser member 102 is targeted thereto.

At least one 45 degree connector piece 134 is included, said 45 degree connector piece 134 interconnectable with the at least one measuring rod 24. The 45 degree connector piece 134 includes two female connectors 20 disposed at 45 degrees with respect to one another and a pair of measuring rods 24 is thereby situated at 45 degrees relative each other. It should be noted that a 90 degree connector piece (not shown) is considered, although, as is readily apparent, the sliding T connector 76 provides for right angular placement of a pair of measuring rods 24.

Figure 5:
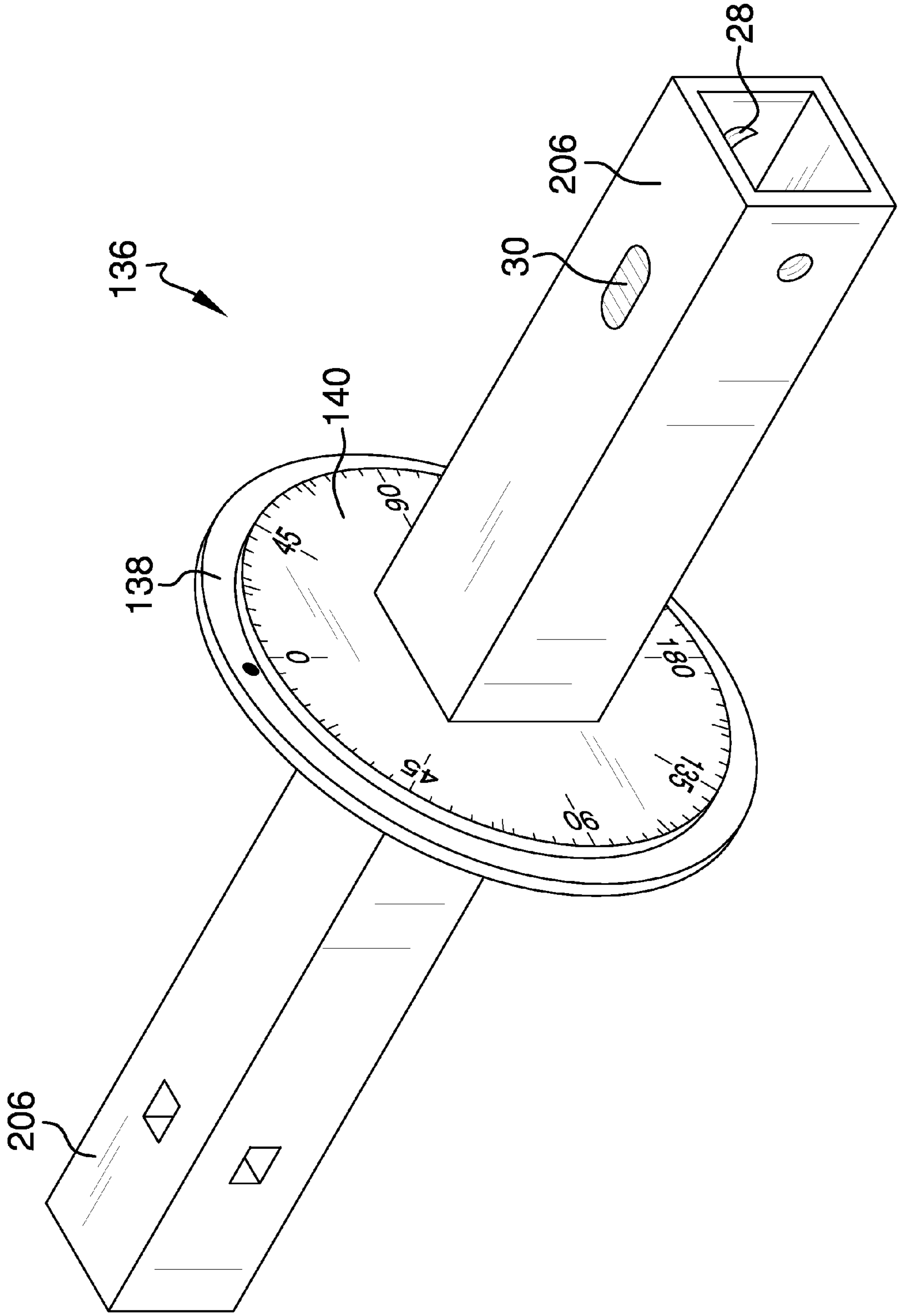
FIG. 5 is a isometric view of a rotating offset connector.

To provide for angles other than 90 degree and 45 degree angles within the desired plumbing path, at least one rotating offset connector 136 is included (see FIG. 5). Said rotating offset connector 136 includes a first female connector **20*b*, a first plate 138 disposed vertically endwise on the first female connector 20*b*, a second female connector 20*c* congruent with the first female connector 20***b*, and a second plate 140 disposed vertically endwise on the second female connector 20*c*. The second plate 140 is rotatably disposed adjacent to the first plate 138, and rotation of the second female connector 20*c* relative the first female connector 20*b* is readable at discrete increments by means of the relation of the second plate 140 relative the first plate 138, whereby degrees of arc are determinable.

Figure 6:
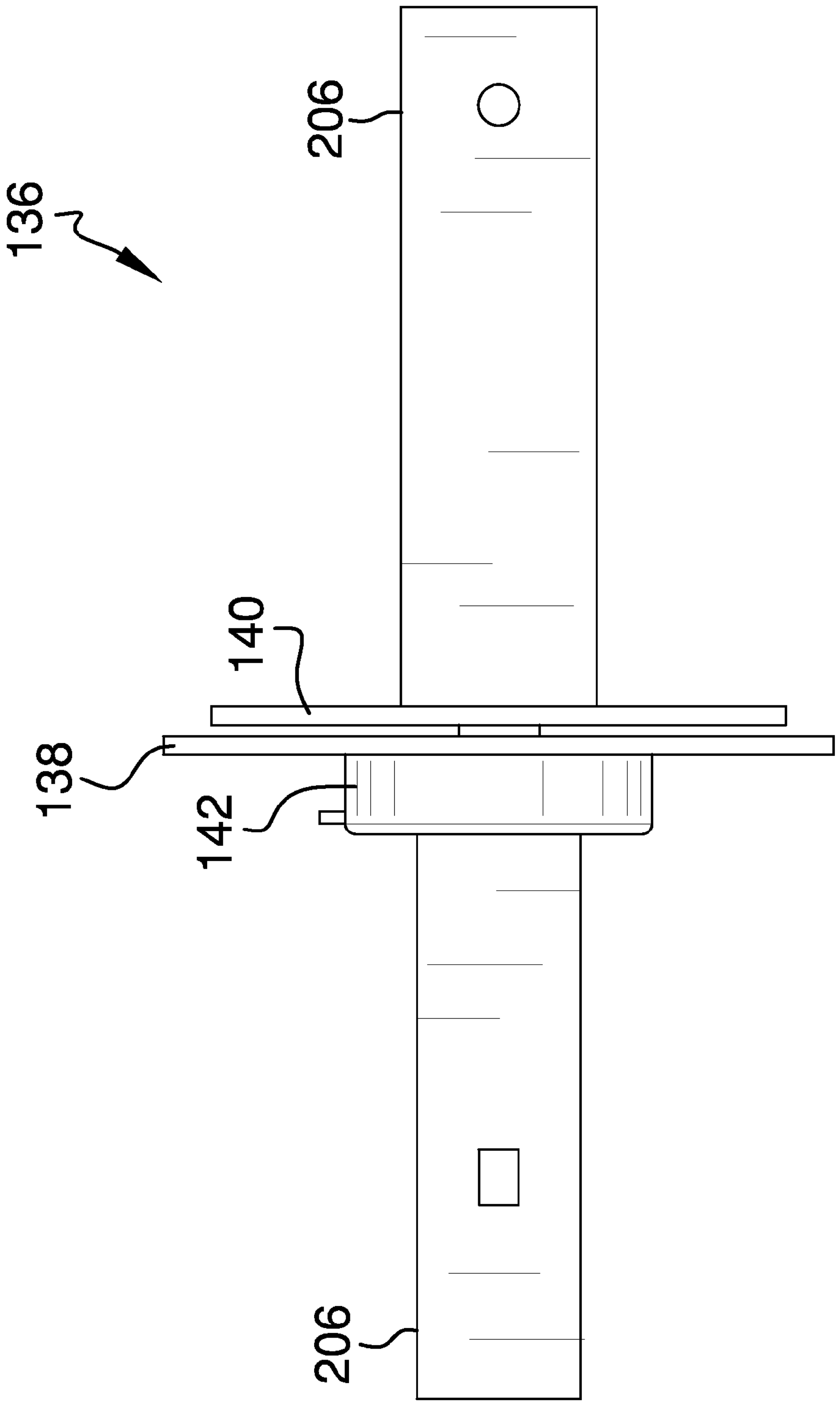
FIG. 6 is a side view of the rotating offset connector.

A ratchet mechanism 142, configured to enable rotation of the second female connector 20*c* within specific increments relative the first female connector 20*b*, is disposed on the rotating offset connector 136, said increments corresponding to degrees of arc (see FIG. 6). The second female connector 20*c* is thereby rotatably disposed relative the first female connector 20*b*, and the second plate 140 rotates adjacent the first plate 138 when the second female connector 20*c* is rotated and an angle of rotation is discernible thereat. A measuring rod 24 situated perpendicularly relative the second female connector 20*c* of the rotating offset connector 136 is thereby positionable within known angles relative the first female connector 20*b* of the rotating offset connector 136 when said measuring rod 24 is interconnected to said rotating offset connector 136.

At least one stand measuring rod 144 is included. Said stand measuring rod 144 is configured to slidingly engage with the female connector 20 disposed on the support member 118 of the at least one guide member 116. The at least one stand measuring rod 144 is interconnectable with a support base 146 (as will be described subsequently) whereby a measuring rod 24 may be supported by means of the guide member 116 guide piece 124, as desired at determinable lengths along said measuring rod 24 (see FIG. 14).

The at least one support base 146 includes a rubberlike foot member 148 disposed to contact a surface, a base plate 150 disposed atop the foot member 148, and three female connectors 20 centrally disposed atop the base plate 150, each of the three female connectors 20 disposed perpendicular to each other. A clamp member 152 is releasably attachable to the support base 146, the clamp member 152 threadably insertable through the foot member 148 and the base plate 150 and securable thereat be means of a fastener 154. The support base 146 may be positioned uprightly on the foot member 148 and alternately to other non-horizontal surfaces by means of the clamp member 152, when desired, whereby the stand measuring rod 144 is supportable in either of three axial planes relative the base plate 150. When not in use, the clamp member 152 is storable within a space provided in the support base 146.

The interconnectivity of the above described elements enables erection of the instant plumbing path guide apparatus 10 along any desired plumbing path wherein measurements for sections of extant pipe to be plumbed are readily discernible and, by virtue of erecting the instant plumbing path guide 10 along said plumbing path, calculations for relevant sections of extant pipe are obviated.

What is claimed is:

1. A plumbing path guide apparatus consisting of a plurality of interconnectable elements, the plumbing path guide apparatus comprising at least one of the following:

at least one measuring rod;

at least one x-connector connectable to an extant pipe and interconnectable with the at least one measuring rod;

at least one saddle connector configured to girdle an extant pipe, the saddle connector interconnectable with the at least one measuring rod;

at least one sliding T connector, said sliding T connector slidably positional upon the at least one measuring rod, the sliding T connector interconnectable with the at least one measuring rod;

at least one guide member interconnectable with the at least one measuring rod;

at least one grid plate attachable to the at least one guide member;

at least one laser member attachable to the at least one measuring rod and the at least one guide member, the x-connector, and the saddle connector;

at least one 45 degree connector piece interconnectable with the at least one measuring rod;

at least one rotating offset connector interconnectable with the at least one measuring rod, the rotating offset connector configured to display an offset angle;

at least one stand measuring rod configured to slidingly engage with the at least one guide member;

at least one support base interconnectable with the at least one stand measuring rod;

wherein the at least one measuring rod is connectable within and supportable throughout a perceived plumbing path whereby sections of extant pipe to be fitted within the plumbing path are measureable throughout the plumbing path by erection of the plumbing path guide apparatus.

2. The plumbing path guide apparatus of claim 1 wherein interconnectivity between the at least one measuring rod, the at least one x-connector, the at least one saddle connector, the at least one sliding T connector, the at least one guide member, the at least one laser member, the at least one 45 degree connector piece, the at least one offset connector, the at least one stand measuring rod, and the at least one support base is enabled by means of female connectors and male connectors configured to releasably mate with each other.

3. The plumbing path guide apparatus of claim 2 wherein each female connector has securing means disposed thereon whereby a male connector interconnected with said female connector is releasably secureable therein.

4. The plumbing path guide apparatus of claim 3 wherein the x-connector comprises:

a central member;

a plurality of attachment members disposed extending from the central member, each of the plurality of attachment members having a plurality of holes disposed thereon;

a female connector disposed perpendicularly upon the central member;

a plurality of fasteners configured to releasably engage with each of the plurality of holes;

wherein the x-connector is removably attachable to an extant pipe, the plurality of attachment members configured to overlie a flange of said extant pipe, whereby each of the plurality of fasteners releasably secures the x-connector to the pipe and the female connector is connectable with a male connector disposed on another interconnectable element.

5. The plumbing path guide apparatus of claim 4 wherein the saddle connector further comprises:

a base member configured to overlie an extant section of pipe, the base member having a first end and a second end;

a first strap disposed on the base member first end, the first strap depending therefrom, the first strap configured to be releasably attachable around said extant section of pipe;

a pair of second straps disposed on the base member proximal to the second end, each of said pair of second straps configured to be releasably attachable around said extant section of pipe;

a female connector disposed perpendicularly atop the base member;

a leveling member disposed proximal to the female connector, the leveling member having a spirit level and a dial thereupon;

a first adjustment screw disposed within the base member, said first adjustment screw rotatably disposed thereat, the first adjustment screw rotatable whereby the base member is situational atop said extant pipe section;

a second adjustment screw disposed in one of the pair of second straps, the second adjustment screw rotatably disposed thereat, the second adjustment screw rotatable whereby the saddle connector is situationally secureable with respect to the section of extant pipe;

wherein the saddle connector is attachable around an extant section of pipe and positional thereupon and the female connector is interconnectable with the male connector disposed on another element of the plumbing path guide apparatus.

6. The plumbing path guide apparatus of claim 5 wherein the at least one sliding T connector comprises:

a first cross piece configured to slidingly engage with the at least one measuring rod;

a vertical piece centrally disposed upon the first cross piece, the vertical piece oriented perpendicularly from and downwardly with respect to the first cross piece, the vertical piece including a female connector disposed endwise thereupon;

a second cross piece having a first arm and a second arm disposed perpendicularly with respect to the first cross piece and the vertical piece, each of the first arm and the second arm disposed opposite one another from the center of the first cross piece, each of the first arm and second arm comprising a female connector disposed endwise thereupon;

a pair of male connectors disposed atop the first cross piece;

an arch member connectable to the pair of male connectors, the arch member having a female connector disposed at a vertex thereof;

a plate member centrally disposed upon the first cross piece;

a pair of spirit levels disposed in the plate member;

a measuring field centrally disposed within the plate member, the measuring field including indicia thereupon for measuring situational aspects relative the sliding T connector;

a pair of slide runners disposed on the plate member, each of the pair of slide runners disposed upon each of the first arm and second arm of the second cross piece, said pair of slide runners configured with indicia to measure spatial situations arising from position of the sliding T connector;

a plurality of ridges disposed upon each of the pair of slide runners configured to align extant string line strung therefrom;

an extensible measuring tape slidably disposed endwise in each of the pair of slide runners;

securing means disposed proximal to each of the female connectors and upon the first cross piece;

wherein the at least one measuring rod is slidably situational within the first cross piece and secureable therein and each female connector releasably secures a male connector inserted thereto.

7. The plumbing path guide apparatus of claim 6 wherein the at lest one guide member comprises:

a female connector configured to slidably receive a measuring rod therein, the female connector configured to be slidably positional along said measuring rod;

a support member disposed upon the female connector;

a horizontal bar centrally disposed upon the support member;

a pair of vertical bars disposed endwise on either end of the horizontal bar;

a guide piece disposed upon the horizontal bar, said guide piece configured to releasably receive a measuring rod therein;

a releasable latch disposed upon the guide piece, said latch configured to releasably secure a measuring rod to the guide piece when the at least one guide member is used upside down and within a non-horizontal plane;

at least one grid plate releasably attachable to the horizontal bar and each of the pair of vertical bars, said at least one grid plate having a grid disposed thereupon, said grid demarking regular and known intervals across the area of the grid plate;

a door hingedly disposed centrally within the at least one grid plate, said door openable whereby a laser reading is enabled upon a measuring rod slidably mounted to the guide piece;

wherein the grid plate demarks desired measurements when the laser member is targeted thereto.

8. The plumbing path guide apparatus of claim 7 wherein the at least one laser member comprises:

a housing, the housing configured to resemble and interconnect with the at least one measuring rod;

a laser centrally disposed within the housing, said housing having a male connector disposed in one end and a female connector disposed in the other end;

an on-off button;

a release button configured to disconnect the female connector when depressed;

wherein the laser shines a dot in a plane congruent with the housing whereby the position of the laser is sensible in space and a desired positional relationship with respect to said laser member is discernible.

9. The laser member of claim 8 further comprising a sighting member slidingly attachable to the housing, the sighting member having an aperture disposed therein through which aperture the laser is shone.

10. The plumbing path guide apparatus of claim 8 wherein the 45 degree connector piece comprises two female connectors disposed at 45 degrees with respect to one another.

11. The plumbing path guide apparatus of claim 10 wherein the rotating offset connector comprises:

a first female connector;

a first plate centrally disposed vertically endwise on the first female connector;

a second female connector rotatably disposed in a plane congruent with the first female connector;

a second plate centrally disposed vertically endwise on the second female connector, the second plate rotatably disposed adjacent the first plate;

wherein the second female connector is rotatably disposed relative the first female connector, whereby the second plate rotates adjacent the first plate when the second female connector is rotated and an angle of rotation is discernible thereat.

12. The offset connector of claim 11 further comprising a ratchet mechanism configured to enable rotation of the second female connector within specific increments relative the first female connector, said increments corresponding to degrees of arc.

13. The plumbing path guide apparatus of claim 12 wherein the at least one support base comprises:

a rubberlike foot member;

a base plate disposed atop the foot member;

three female connectors centrally disposed atop the base plate, each of the three female connectors disposed perpendicular to each other;

a clamp member releasably attachable to the support base, the clamp member threadably insertable through the foot member and the base plate;

wherein the support base stands uprightly on the foot member and is attachable to an extant surface by means of the clamp member, when desired, whereby a stand measuring rod is supportable in either of three axial planes.

14. The plumbing path guide apparatus of claim 13 wherein the measuring rod comprises a right rectangular prism having indicia of regular lengths disposed thereupon, the measuring rod including a male connector disposed on each end whereby the measuring rod is interconnectable at either end with a female connector, as desired.

15. The plumbing path guide apparatus of claim 13 wherein the measuring rod comprises a male connector disposed at one and a female connector disposed at the opposite end.

16. The plumbing path guide apparatus of claim 13 wherein the measuring rod comprises a female connector disposed on each end.

17. A plumbing path guide apparatus consisting of a plurality of interconnectable elements erectable along a desired plumbing path for measuring sections of pipe to be assembled along said plumbing path, the plurality of elements comprising:

at lease one right rectangular prismatic measuring rod having a plurality of length indicia disposed thereupon;

at least one x-connector connectable to an extant pipe, said x-connector comprising:

a central member;

a plurality of attachment members disposed extending from the central member, each of the plurality of attachment members having a plurality of holes disposed thereon;

a female connector disposed perpendicularly upon the central member;

a plurality of fasteners configured to releasably engage with each of the plurality of holes;

wherein the x-connector is removably attachable to an extant pipe, the plurality of attachment members configured to overlie a flange of said extant pipe, whereby each of the plurality of fasteners releasably secures the x-connecter to the pipe and the female connector is connectable with a male connector disposed on another interconnectable element;

a saddle connector configured to girdle an extant pipe, said saddle connector comprising:

a base member configured to overlie an extant section of pipe, the base member having a first end and a second end;

a first strap disposed on the base member first end, the first strap depending therefrom, the first strap configured to be releasably attachable around said extant section of pipe;

a pair of second straps disposed on the base member proximal to the second end, each of said pair of second straps configured to be releasably attachable around said extant section of pipe;

a female connector disposed perpendicularly atop the base member;

a leveling member disposed proximal to the female connector, the leveling member having a spirit level and a dial thereupon;

a first adjustment screw disposed within the base member, said first adjustment screw rotatably disposed thereat, the first adjustment screw rotatable whereby the base member is situational atop said extant pipe section;

a second adjustment screw disposed in one of the pair of second straps, the second adjustment screw rotatably disposed thereat, the second adjustment screw rotatable whereby the saddle connector is situationally secureable with respect to the section of extant pipe;

wherein the saddle connector is attachable around an extant section of pipe and positional thereupon and the female connector is interconnectable with the male connector disposed on another element of the plumbing path guide apparatus;

at least one sliding T connector, said sliding T connector slidably positional upon the at least one measuring rod, said sliding T connector interconnectable with the at least one measuring rod, the sliding T connector comprising:

a first cross piece configured to slidingly engage with the at least one measuring rod;

a vertical piece centrally disposed upon the first cross piece, the vertical piece oriented perpendicularly and downwardly from the first cross piece, the vertical piece including a female connector disposed endwise thereupon;

a second cross piece having a first arm and a second arm disposed perpendicularly with respect to the first cross piece and the vertical piece, each of the first arm and the second arm disposed opposite one another from the center of the first cross piece, each of the first arm and second arm comprising a female connector disposed endwise thereupon;

a pair of male connectors disposed atop the first cross piece;

an arch member connectable with the pair of male connectors, the arch member having a female connector disposed at a vertex thereof;

a plate member centrally disposed upon the first cross piece;

a pair of spirit levels disposed in the plate member;

a measuring field centrally disposed within the plate member, the measuring field including indicia thereupon for measuring situational aspects relative the sliding T connector;

a pair of slide runners disposed on the plate member, each of the pair of slide runners disposed upon each of the first arm and second arm of the second cross piece, said pair of slide runners configured with indicia to measure spatial situations arising from position of the sliding T connector;

a plurality of ridges disposed upon each of the pair of slide runners configured to align extant string line strung therefrom;

an extensible measuring tape slidably disposed endwise in each of the pair of slide runners;

securing means disposed proximal to each of the female connectors and upon the first cross piece;

wherein the at least one measuring rod is slidably situational within the first cross piece and secureable therein and each female connector releasably secures a male connector inserted thereto;

at least one laser member attachable to the at least one measuring rod and the at least one guide member, the x-connector, and the saddle connector, said laser member comprising:

a housing, the housing configured to resemble and interconnect with the at least one measuring rod;

a laser centrally disposed within the housing;

a male connector disposed endwise upon the housing;

a female connector disposed endwise upon the housing;

an on-off button;

a release button configured to disconnect the female connector end when depressed;

wherein the laser shines a dot in a plane level with the housing whereby the position of the laser is sensible in space and a desired positional relationship with respect to said laser is discernible;

at least one guide member interconnectable with the at least one measuring rod, said guide member comprising;

a female connector configured to slidably receive a measuring rod therein, the female connector configured to be slidably positional along said measuring rod;

a support member disposed upon the female connector;

a horizontal bar centrally disposed upon the support member;

a pair of vertical bars disposed endwise on either end of the horizontal bar;

a guide piece disposed upon the horizontal bar, said guide piece configured to releasably receive a measuring rod therethrough;

a releasable latch disposed upon the guide piece, said latch configured to releasably secure a measuring rod to the guide piece when the at least one guide member is used upside down;

at least one grid plate releasably attachable to the horizontal bar and each of the pair of vertical bars, said at least one grid plate having a grid disposed thereupon, said grid demarking regular and known intervals across the area of the grid plate;

a door hingedly disposed centrally within the at least one grid plate, said door openable whererby a laser reading is enabled upon a measuring rod slidably mounted to the guide piece;

wherein the grid plate demarks desired measurements when the laser member is targeted thereto;

at least one 45 degree connector piece interconnectable with the at least one measuring rod, said 45 degree connector piece comprising two female connectors disposed at 45 degrees with respect to one another;

at least one rotating offset connector interconnectable with the at least one measuring rod, the rotating offset connector configured to display an offset angle, said rotating offset connector comprising:

a first female connector;

a first plate centrally disposed vertically endwise on the first female connector;

a second female connector congruent with the first female connector;

a second plate centrally disposed vertically endwise on the second female connector;

a ratchet mechanism configured to enable rotation of the second female connector within specific increments relative the first female connector, said increments corresponding to degrees of arc;

wherein the second female connector is rotatably disposed relative the first female connector, whereby the second plate rotates adjacent the first plate when the second female connector is rotated and an angle of rotation is discernible thereat;

at least one stand measuring rod configured to slidingly engage with the at least one guide member, said at least one stand measuring rod interconnectable with all elements with which the measuring rod is interconnectable;

at least one support base interconnectable with the at least one stand measuring rod, said support base comprising:

a rubberlike foot member;

a base plate disposed atop the foot member;

three female connectors centrally disposed atop the base plate, each of the three female connectors disposed perpendicular to each other;

a clamp member releasably attachable to the support base, the clamp member threadably insertable through the foot member and the base plate;

wherein the support base stands uprightly on the foot member and is attachable to an extant surface by means of the clamp member, when desired, whereby the stand measuring rod is supportable in either of three axial planes.

18. The plumbing path guide apparatus of claim 17 wherein interconnectivity between the at least one measuring rod, the at least one x-connector, the at least one saddle connector, the at least one sliding T connector, the at least one guide member, the at least one laser member, the at least one 45 degree connector piece, the at least one offset connector, the at least one stand measuring rod, and the at least one support base is enabled by means of female connectors and male connectors configured to releasably mate with each other.

19. The plumbing path guide apparatus of claim 18 wherein each female connector has securing means disposed thereon whereby a male connector interconnected with said female connector is releasably secureable therein.

* * * * *